United States Patent [19]

Wang

[11] Patent Number: 5,335,025
[45] Date of Patent: Aug. 2, 1994

[54] DETACHABLE MOUNTING FOR SUNSHADE AND SUNGLASSES ON VISION CORRECTING EYEGLASSES

[76] Inventor: Wen T. Wang, #246-1, Kang Kou, Kang Kou Tsun, An Ting Hsiang, Tainan Hsien, Taiwan

[21] Appl. No.: 58,212
[22] Filed: May 10, 1993
[51] Int. Cl.$^5$ .............. G02C 3/00; G02C 7/16; G02C 9/02
[52] U.S. Cl. .............. 351/47; 351/44; 351/58; 351/59; 351/153; 2/13
[58] Field of Search .............. 2/10, 12, 13, 15; 351/44, 47, 48, 57, 58, 59, 63, 153

[56] References Cited

U.S. PATENT DOCUMENTS

| | | | |
|---|---|---|---|
| 2,998,610 | 9/1961 | Spero | 2/13 |
| 3,011,170 | 12/1961 | Lutz | 351/47 |
| 3,901,589 | 8/1975 | Bienenfeld | 2/13 |
| 4,534,627 | 8/1985 | Vosper | 351/57 |
| 4,740,069 | 4/1988 | Baum | 351/47 |
| 4,856,089 | 8/1989 | Horton | 2/13 |
| 4,951,316 | 8/1990 | Moody | 2/12 |

Primary Examiner—William L. Sikes
Assistant Examiner—David R. Parsons
Attorney, Agent, or Firm—Morton J. Rosenberg; David I. Klein

[57] ABSTRACT

A sunshade and sunglasses which may be interchangeably detachably attached to vision correcting eye glasses is provided. The atttachment being by means of flexigrip-catch pairs. A pair of flexigrips are integrally formed on the top of an eyeglass frame for correcting lenses and are adapted for being received by a first pair of catches that are integrally formed on the top of a frame of a pair of sunglasses which has no temples, or a second pair of catches fixedly positioned underneath a sunshade. The position of the respective first and second pairs of catches are in alignment with the position of the flexigrips. By pressing the first pair of catches onto the respective flexigrips, the sunglass lenses are pivotally attached thereon.

1 Claim, 3 Drawing Sheets

DETACHABLE MOUNTING FOR SUNSHADE AND SUNGLASSES ON VISION CORRECTING EYEGLASSES

FIELD OF THE INVENTION

This invention relates to sunshine protection, More particularly, this invention is directed to a sunshade or sunglass lenses which can be detachably mounted to a main frame of a pair of correcting eyeglasses.

BACKGROUND OF THE INVENTION

Outdoor activities have always been attractive to people, especially to those who work in an office all day long. However, the shining of sunlight into people's eyes has also a problem. Therefore, people wear sunglasses when outdoors to prevent the sunlight from shining directly into their eyes. There is, however, a problem for those people who wear correctional glasses to wear other glasses when outdoors. It is for that reason that colored lenses have been invented, such lenses use a pair of clips to secure the colored lenses on the correctional glasses. However, such lenses are very inconvenient to store when not in use.

SUMMARY OF THE INVENTION

Accordingly, it is a principle object of the present invention to provide a pair of sunglasses and a sunshade, either of which can be detacbably mounted to the frame of vision correcting eyeglasses.

It is another object of the present invention to provide a pair of sunglasses which can be pivoted up and down on the frame of vision correcting eyeglasses.

It is yet another object of the present invention to provide a pair of sunglasses and a sunshade, each detachably mountable on vision correcting eyeglasses which are easy to mount and dismount.

It is a further object of the present invention to provide a pair of sunglasses and sunshade to be mounted on the main frame of vision correcting eyeglasses which are inexpensive to manufacture.

These and other objects of the invention will become apparent to those skilled in the art upon reading and understanding the detailed description of the invention set forth in the following paragraphs together with the drawings which form a part hereof, and wherein:

DETAILED DESCRIPTION OF THE PREFERRED EMBODIMENT

Figure 1:
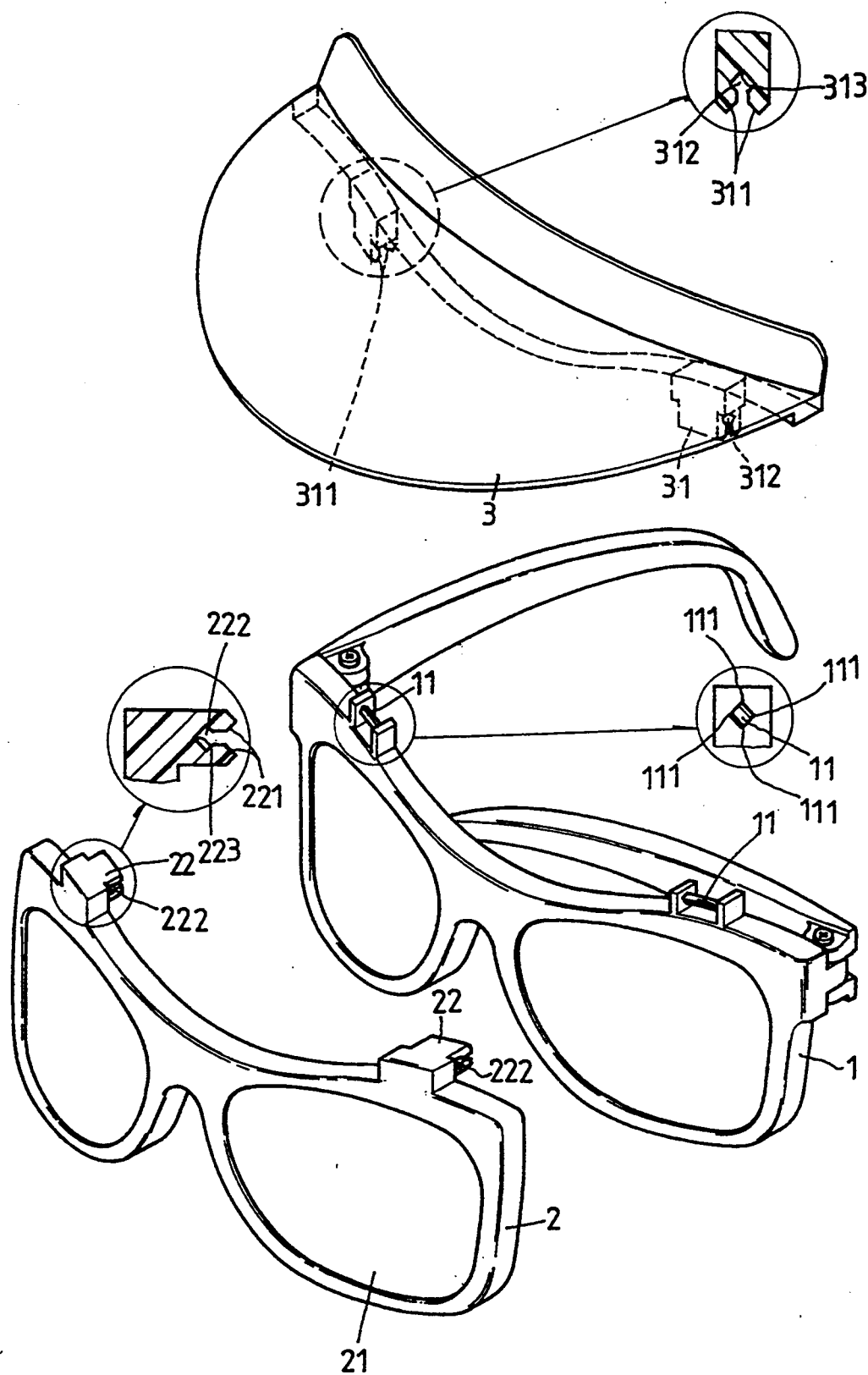
FIG. 1 is an exploded view of the present invention.

Referring now to the Drawings, wherein that which is shown is for the purpose of illustrating a preferred embodiment only and not for the purpose of limiting the same, FIG. 1 shows an exploded view of the present invention. As shown, a pair of flexigrips 11 are integrally formed on the top ends of the frame of a pair of vision correcting eyeglasses 1 having conventional temples. A pair of catches 22 are integrally formed on respective top ends of a second pair of eyeglasses 2 in alignment with the pair of flexigrips 11. A sunshade 3 is provided with a pair of catches 31 disposed in spaced relation and in alignment with the pair of flexigrips 11 for releasable coupling therewith.

Each flexigrip 11 is defined by a shaft extending substantially parallel to the longitudinal extension of the eyeglass frame 1 and spaced upwardly above the top edge of the frame. Each flexigrip 11 is configured to have four angles 111 and is shaped like a rhombus.

Each of the catches 22 is integrally formed on the top edge of the frame of the second pair of eyeglasses 2, extending at a 90 degree angle with respect to the plane of the lenses 21. Each catch 22 has an open end 221 facing toward the back side of the frame of eyeglasses 2 and a channel 222 extending longitudinally therethrough and defined by angularly directed walls 223. The channel 222 is formed such that its shape corresponds to the shape of that of the flexigrips 11.

The sunshade 3 has two catches 31 integrally formed on a bottom surface at respective ends thereof and are identical to the catches 22, with an exception that the catches 31 extend perpendicular to the plane of the sunshade, extending downwardly from the inner bottom portion of the sunshade 3. Each catch 31 is formed with a longitudinally extended channel 312 defined by angularly directed walls 313 and an open end 311 facing downward.

Figure 2:
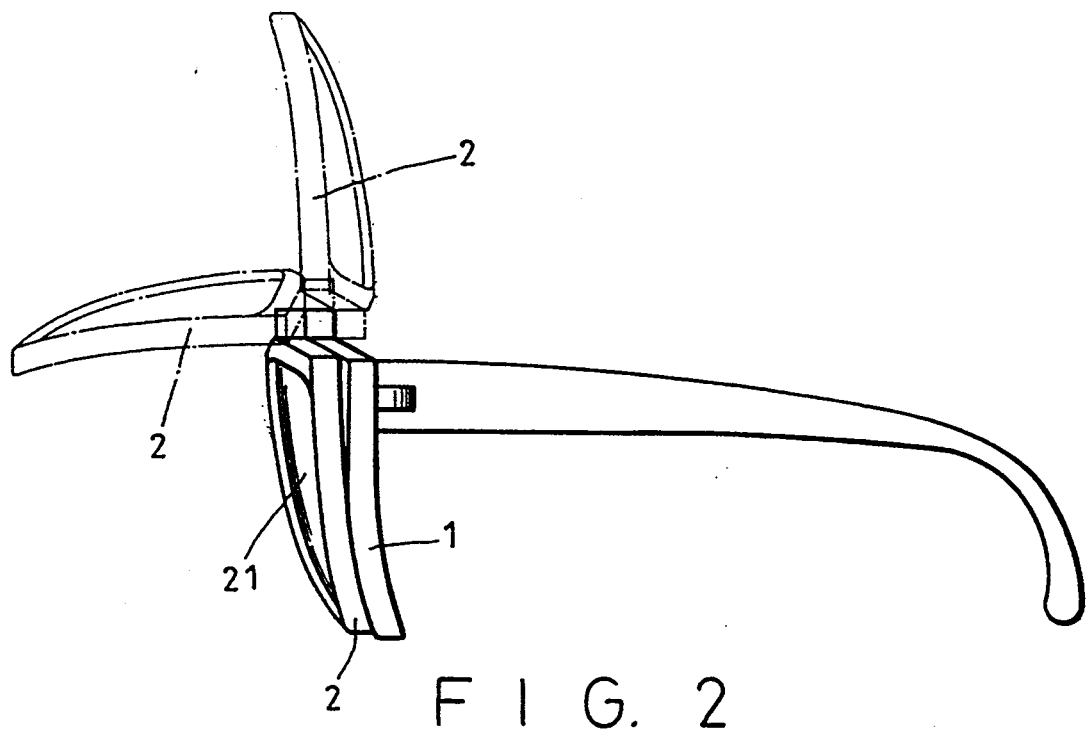
FIG. 2 is a side elevational view of FIG. 1 showing a lens in three different positions.
Figure 3:
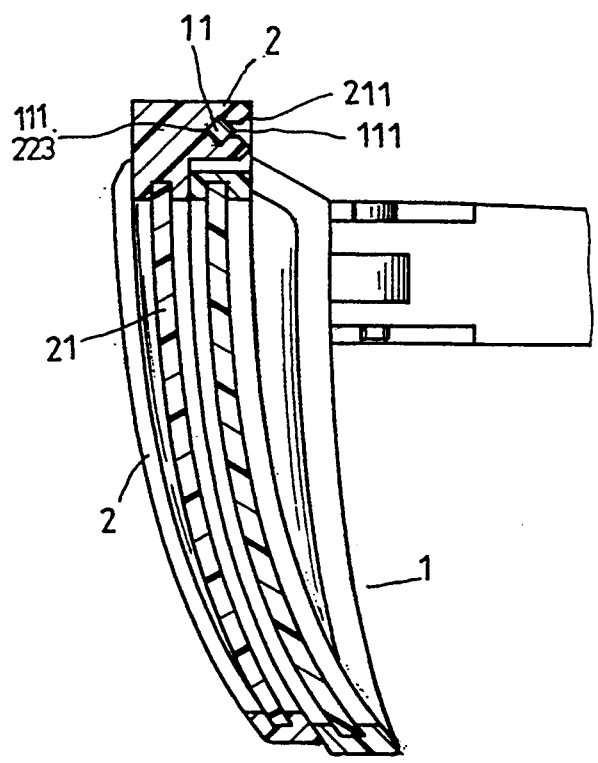
FIG. 3 is an enlarged view of FIG. 2 showing the lenses in one position, partially sectioned; and, FIG. 4 is a perspective view of the present invention shown a sunshade mounted on the frame of the eyeglasses.
Figure 4:
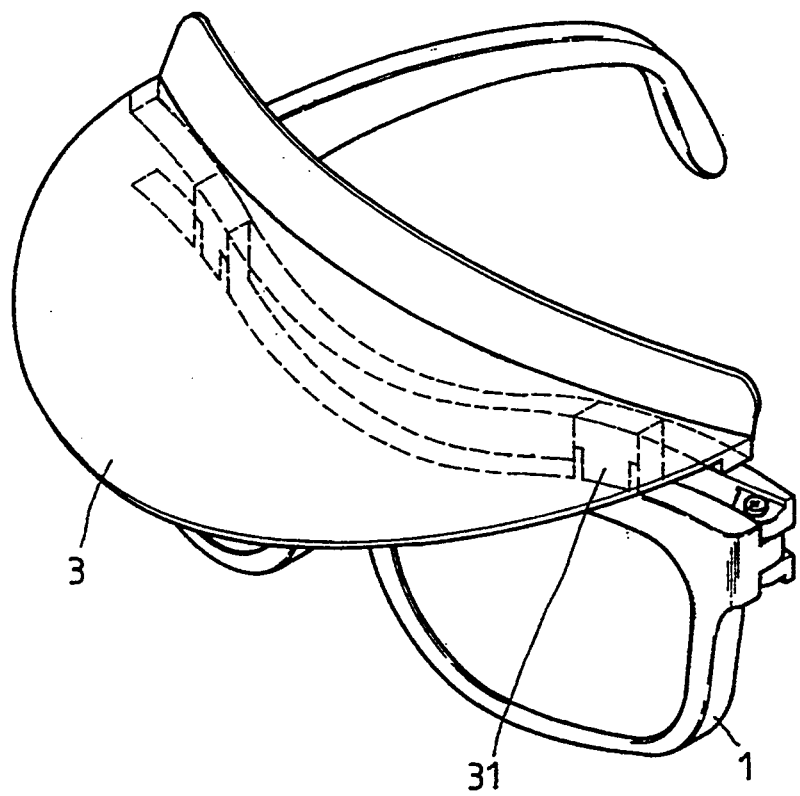

To assemble the present invention, simply insert either the catches 22 of the second pair of eyeglasses 2 or alternatively, the catches 31 of sunshade 3 onto the respective flexigrips 11 of the eyeglasses 1 to provide attachment thereon. The second pair of glasses 2, because of the pivotable character of the catches 22 about the flexigrips 11, may be pushed upwardly, as shown in FIG. 2.

To dismount the presen tinvention, the glasses 2 or the sunshade 3 is simply pulled outwardly , the catches 22, 31 being disengaged from the flexigrips 11 thereby.

The invention has been described with reference to a preferred embodiment. The invention includes or is premised on, or in part, a recognition of a problem potentially affecting the shining of the sun into a person's eyes. The invention provides a modification to vision correcting eyeglasses to prevent or limit the effect of the sun shining into an eyeglass wearer's eyes. Other modifications to the modification suggested herein are intended to be included within the invention in so far as they come within the scope of the subject matter claimed or the equivalents thereof.

I claim:

1. A frame for vision correcting eyeglasses having a pair of temples and being adapted for releasable interchangeable coupling with a secondary eyeglass frame and a sunshade, comprising:

a pair of shaft members affixed to an upper edge of said vision correcting eyeglass frame in longitudinally spaced relation, each of said pair of shaft members extend in said longitudinal direction and are disposed in parallel spaced relation above said upper edge of said vision correcting eyeglass frame, each of said shaft members having a rhomboid contour defined by four angularly directed sides;

a pair of first catches integrally formed on an upper edge of said secondary eyeglass frame in longitudinally spaced relation and in corresponding alignment with said pair of shaft members for releasable coupling therewith, each of said pair of first catches having a first open end directed toward a rear side of said secondary eyeglass frame, said first open end being in open communication with a first channel opening extending longitudinally through each of said pair of first catches, said first channel opening having angularly walls to define a rhomboid channel contour corresponding to said rhomboid contour of said shaft members for pivotal displacement of said secondary eyeglass frame to one of a plurality of discrete positions relative to said vision correcting eyeglass frame defined by said rhomboid contours of said first channels and said shaft members; and, a pair of second catches integrally formed on a lower surface of said sunshade in longitudinally spaced relation and in corresponding alignment with said pair of shaft members for releasable coupling therewith, each of said pair of second catches having a second open end directed away from said lower surface of said sunshade, said second open end being in open communication with a second channel opening extending longitudinally through each of said pair of second catches, said second channel opening having angularly walls to define a rhomboid channel contour corresponding to said rhomboid contour of said shaft members, whereby said secondary eyeglass frame and said sunshade are interchangeably attachable to, and detachable from, said vision correcting eyeglass frame.

* * * * *